(12) United States Patent
Barlet et al.

(10) Patent No.: US 10,898,794 B2
(45) Date of Patent: Jan. 26, 2021

(54) GAMING SUPPORT ASSEMBLY AND CONTROLLER HOLSTER

(71) Applicant: The AbleGamers Foundation, Inc., Kearneysville, WV (US)

(72) Inventors: Mark Barlet, Kearneysville, WV (US); Jessie Hall, Kearneysville, WV (US); Mark Benjamin Greenspan, Kearneysville, WV (US)

(73) Assignee: The AbleGamers Foundation, Inc., Kearneysville, WV (US)

( * ) Notice: Subject to any disclaimer, the term of this patent is extended or adjusted under 35 U.S.C. 154(b) by 0 days.

(21) Appl. No.: 16/153,032

(22) Filed: Oct. 5, 2018

(65) Prior Publication Data

US 2020/0030691 A1  Jan. 30, 2020

Related U.S. Application Data

(60) Provisional application No. 62/703,189, filed on Jul. 25, 2018.

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09)

(58) Field of Classification Search
USPC ................. 463/47; 273/148 B; 206/320, 576
See application file for complete search history.

(56) References Cited

U.S. PATENT DOCUMENTS

| | | | | |
|---|---|---|---|---|
| 6,530,570 B2* | 3/2003 | Ku | ............. | A63F 13/02 273/148 B |
| 6,530,838 B2* | 3/2003 | Ha | ............. | A63F 13/06 463/36 |
| 6,811,491 B1* | 11/2004 | Levenberg | ............. | A63F 13/02 463/47 |
| 6,932,341 B1* | 8/2005 | Kenyon | ............. | A63F 13/02 273/148 B |
| RE39,409 E * | 11/2006 | Sternberg | ............. | A63F 13/06 273/148 B |
| 7,316,618 B2* | 1/2008 | Hsu | ............. | A63F 13/06 463/37 |
| 8,298,090 B2* | 10/2012 | Kazama | ............. | A63F 13/245 463/37 |

(Continued)

*Primary Examiner* — Jacob K Ackun
(74) *Attorney, Agent, or Firm* — Alston & Bird LLP

(57) ABSTRACT

A gaming support apparatus that includes a holster body is provided. The holster body receives a gaming controller disposed therein and includes a peripheral wall. The peripheral wall, in an operational configuration, partially encloses the gaming controller received by the holster body. The holster body further includes a support web that, in the operational configuration, supports the gaming controller received by the holster body. The holster body further includes at least one opening in the holster body that, in the operational configuration, allows access to one or more input elements of the gaming controller received by the holster body. In the operational configuration, the holster body supports the gaming controller such that a user may actuate the one or more input elements of the gaming controller without supporting the weight of the gaming controller.

15 Claims, 8 Drawing Sheets

(56) References Cited

U.S. PATENT DOCUMENTS

| | | | | |
|---|---|---|---|---|
| 8,568,241 | B2* | 10/2013 | Bailey | A63F 13/98 |
| | | | | 206/320 |
| 8,608,564 | B2* | 12/2013 | Navid | A63F 13/22 |
| | | | | 463/36 |
| D699,791 | S* | 2/2014 | Sugino | A63F 13/02 |
| | | | | D21/333 |
| 8,894,066 | B2* | 11/2014 | Sternberg | A63F 11/00 |
| | | | | 273/148 B |
| 2002/0195771 | A1* | 12/2002 | Ku | A63F 13/02 |
| | | | | 273/148 B |
| 2004/0092318 | A1* | 5/2004 | Chen | A63F 13/98 |
| | | | | 463/47 |
| 2006/0279039 | A1* | 12/2006 | Krieger | A63F 13/54 |
| | | | | 273/148 B |
| 2008/0001355 | A1* | 1/2008 | Sparling | A63F 13/98 |
| | | | | 273/148 B |
| 2008/0230987 | A1* | 9/2008 | Jackson | A63F 13/02 |
| | | | | 273/148 B |
| 2010/0081505 | A1* | 4/2010 | Alten | G06F 1/1632 |
| | | | | 463/36 |
| 2014/0141891 | A1* | 5/2014 | Georgy | A63F 13/02 |
| | | | | 463/47 |
| 2014/0323230 | A1* | 10/2014 | Wakitani | A63F 13/24 |
| | | | | 463/47 |
| 2015/0190720 | A1* | 7/2015 | Buller | A63F 13/98 |
| | | | | 463/47 |

* cited by examiner

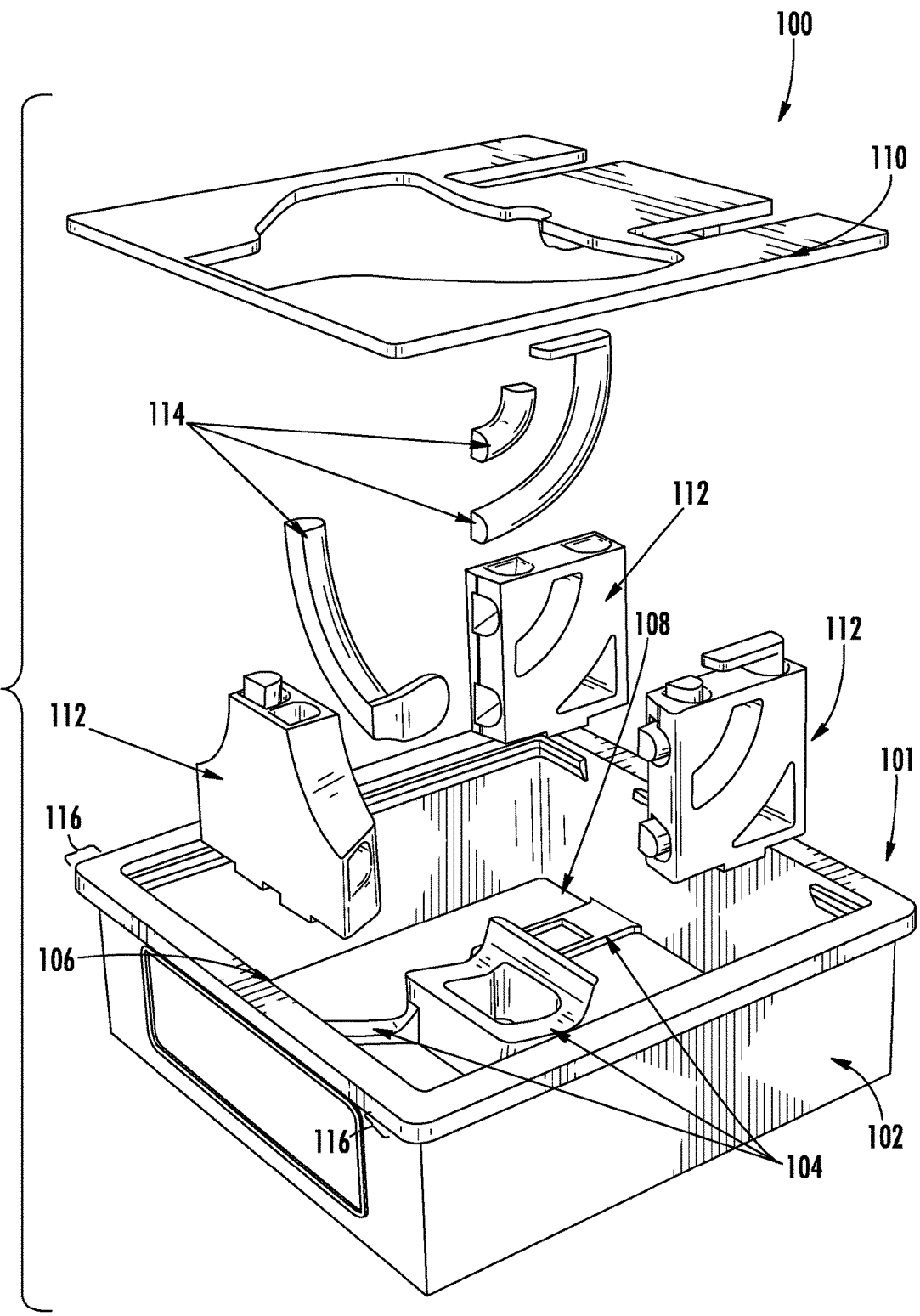

GAMING SUPPORT ASSEMBLY AND CONTROLLER HOLSTER

CROSS-REFERENCE TO RELATED APPLICATIONS

This application incorporates U.S. Provisional Application No. 62/703,189, filed Jul. 25, 2018, by reference herein in its entirety.

FIELD OF THE INVENTION

Embodiments of the present invention relate generally to gaming accessories and, in some embodiments, to gaming controller support devices.

BACKGROUND

Traditional video game controllers often require two hands to hold such that several fingers (e.g., the little finger, ring finger, and middle finger) on each hand must be used in order to support the weight of the controller. The remaining fingers (e.g., the index finger and thumb) are required to perform all of the inputs to the controller via one or more buttons, knobs, joysticks, or the like. For users with fine motor impairment or physical disabilities, it can be difficult to support the weight of the controller in an upright position, let alone also possess the dexterity necessary for providing control inputs by moving the joystick or clicking the buttons of the controller.

Applicant has identified a number of deficiencies and problems associated with conventional controllers and associated gaming and entertainment systems. Through applied effort, ingenuity, and innovation, many of these identified problems have been solved by developing solutions that are included in embodiments of the present invention, many examples of which are described in detail herein.

BRIEF SUMMARY

Embodiments of the presentation invention address the above by providing a gaming support apparatus. With reference to the claimed apparatus, example embodiments of such an apparatus may include a holster body that is configured to receive a gaming controller disposed therein. The holster body may define a peripheral wall that is configured to, in an operational configuration, partially enclose the gaming controller received by the holster body. The holster body may further define a support web that, in the operational configuration, supports the gaming controller received by the holster body. The holster body may further define at least one opening in the holster body that, in the operational configuration, allows access to one or more input elements of the gaming controller received by the holster body. In the operational configuration, the holster body may support the gaming controller such that a user may actuate the one or more input elements of the gaming controller without supporting the weight of the gaming controller.

In some embodiments, in the operational configuration, the support web may be disposed proximate a second surface of the gaming controller, and a first opening of the holster body may be disposed proximate a first surface of the gaming controller. In such an embodiment, the gaming support apparatus may further include a cover plate that, in the operational configuration, partially encloses the first surface of the gaming controller. In another embodiment, the holster body may define a second opening opposite the first opening configured to allow access to the second surface of the controller.

In some embodiments, the holster body may be received by a corresponding cavity defined in a planar surface such that, in the operational configuration, the planar surface supports the weight of the holster body and gaming controller disposed therein. In other embodiments, the gaming support apparatus may comprise the planar surface. In such embodiments, the peripheral wall may further include a lip member configured to engage the planar surface so as to limit movement of the holster body to a single direction.

In some cases, the gaming support apparatus may include one or more button assemblies supported by the holster body. Each button assembly may receive a user input proximate the first surface of the gaming controller so as to actuate one or more input elements defined by the second surface of the gaming controller. In such an embodiment, the one or more button assemblies may each define a leaf spring that, at a first end, contacts an input element defined by the second surface of the gaming controller, and, at a second end, receives a user input. In some embodiments, the one or more button assemblies may be displaceable within the holster body and may be removable from the holster body so as to accommodate a gaming controller of any dimension.

BRIEF DESCRIPTION OF THE SEVERAL VIEWS OF THE DRAWINGS

Figure 1:
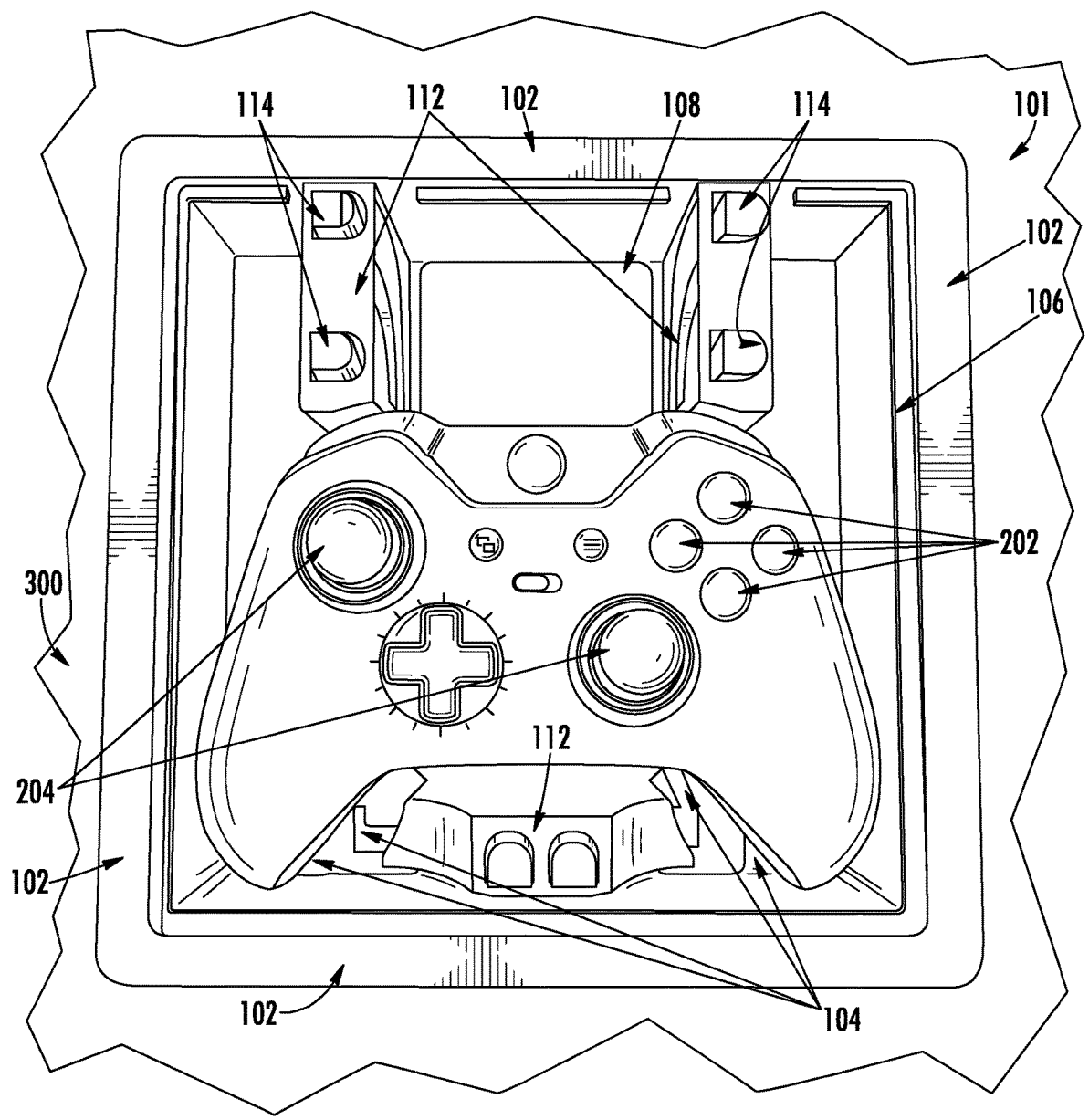

Having thus described the invention in general terms, reference will now be made to the accompanying drawings, which are not necessarily drawn to scale, and wherein:

FIG. 1 illustrates a top down view of a gaming support apparatus receiving a gaming controller, in accordance with an example embodiment.

Figure 2:
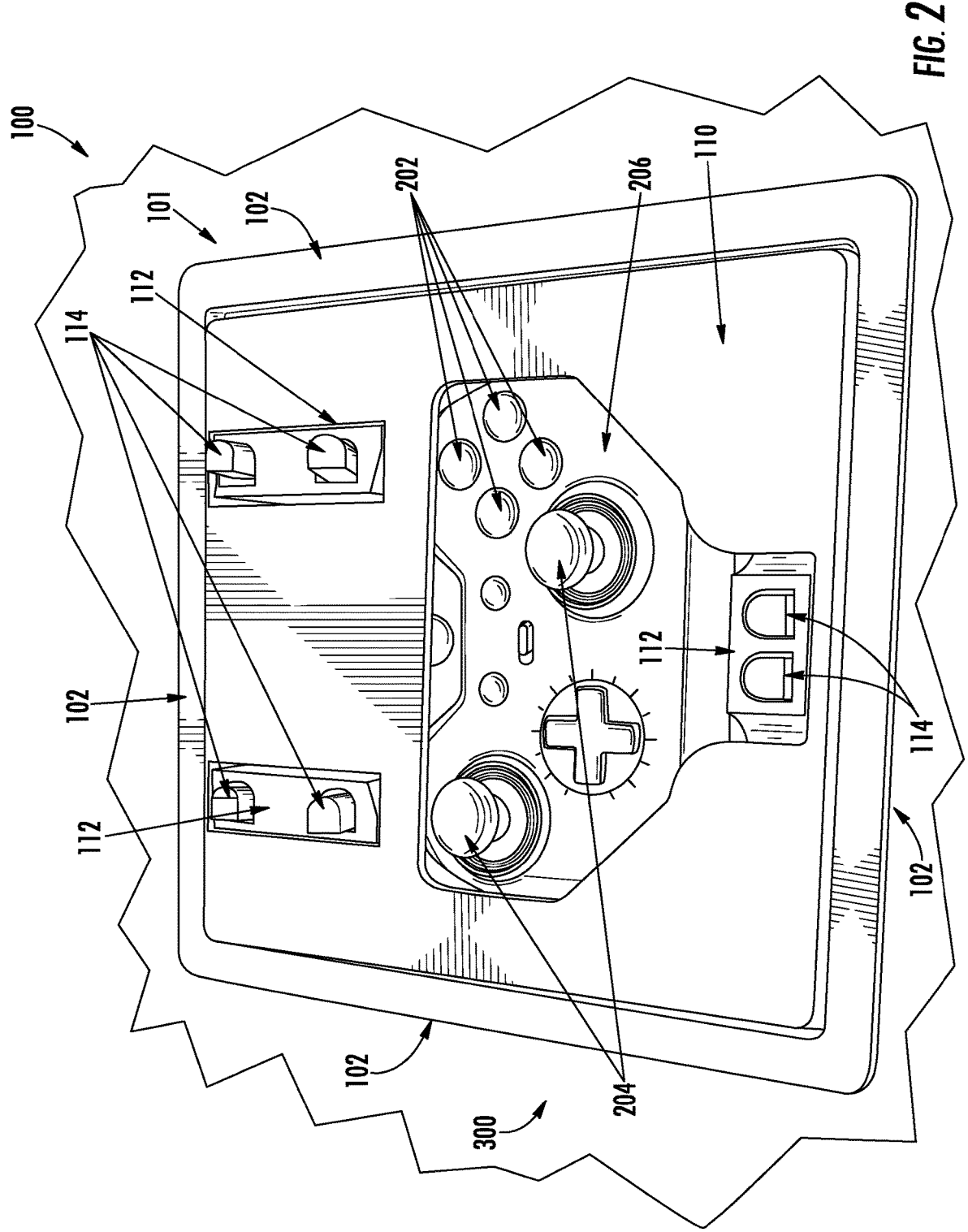

FIG. 2 illustrates a top down view of the gaming support apparatus of FIG. 1 with a cover plate installed.

Figure 3A:
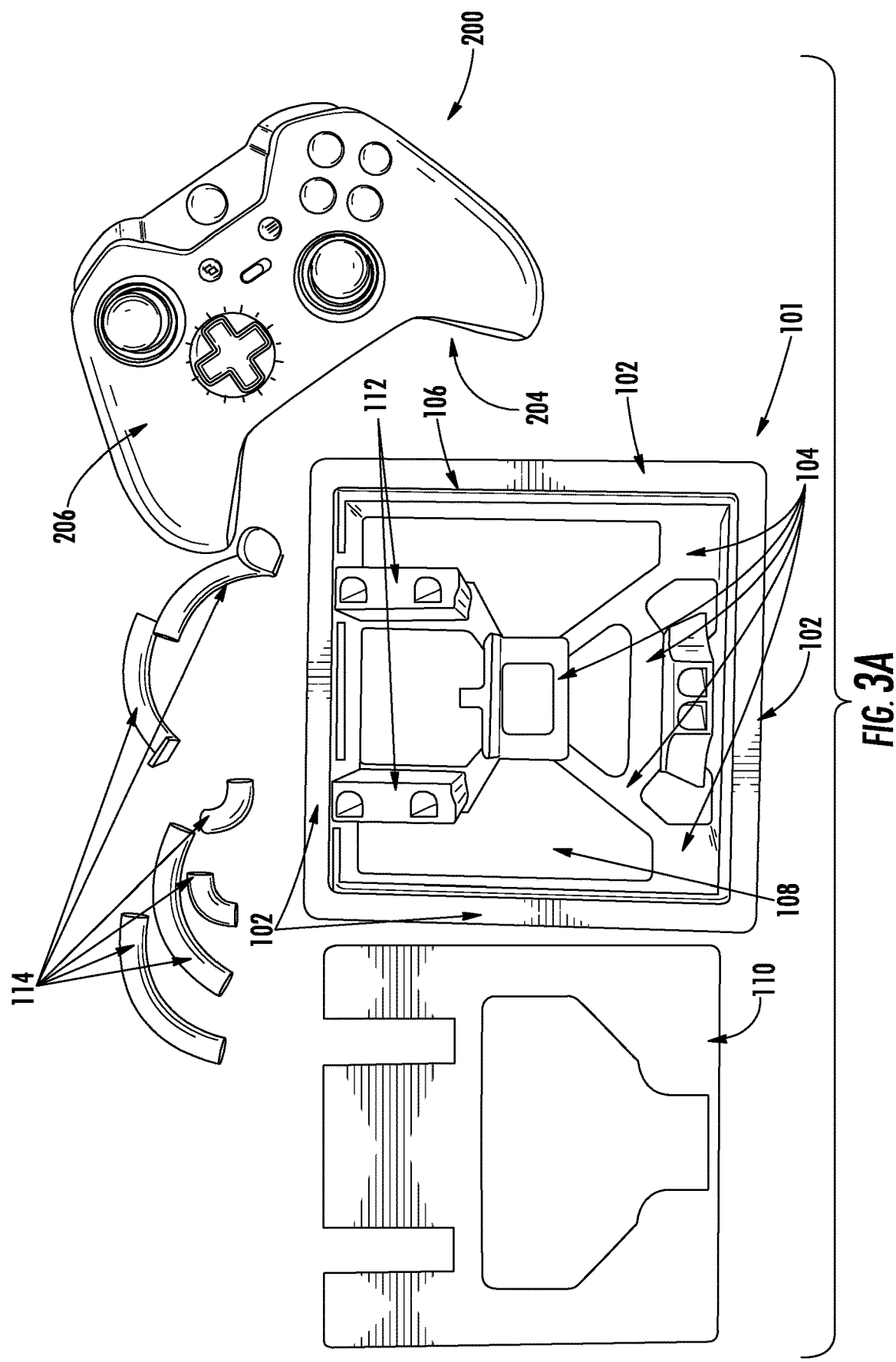

FIG. 3A illustrates a top down view of an exploded view of a gaming support apparatus in which the holster body is installed in a planar surface, in accordance with an example embodiment.

Figure 3B:
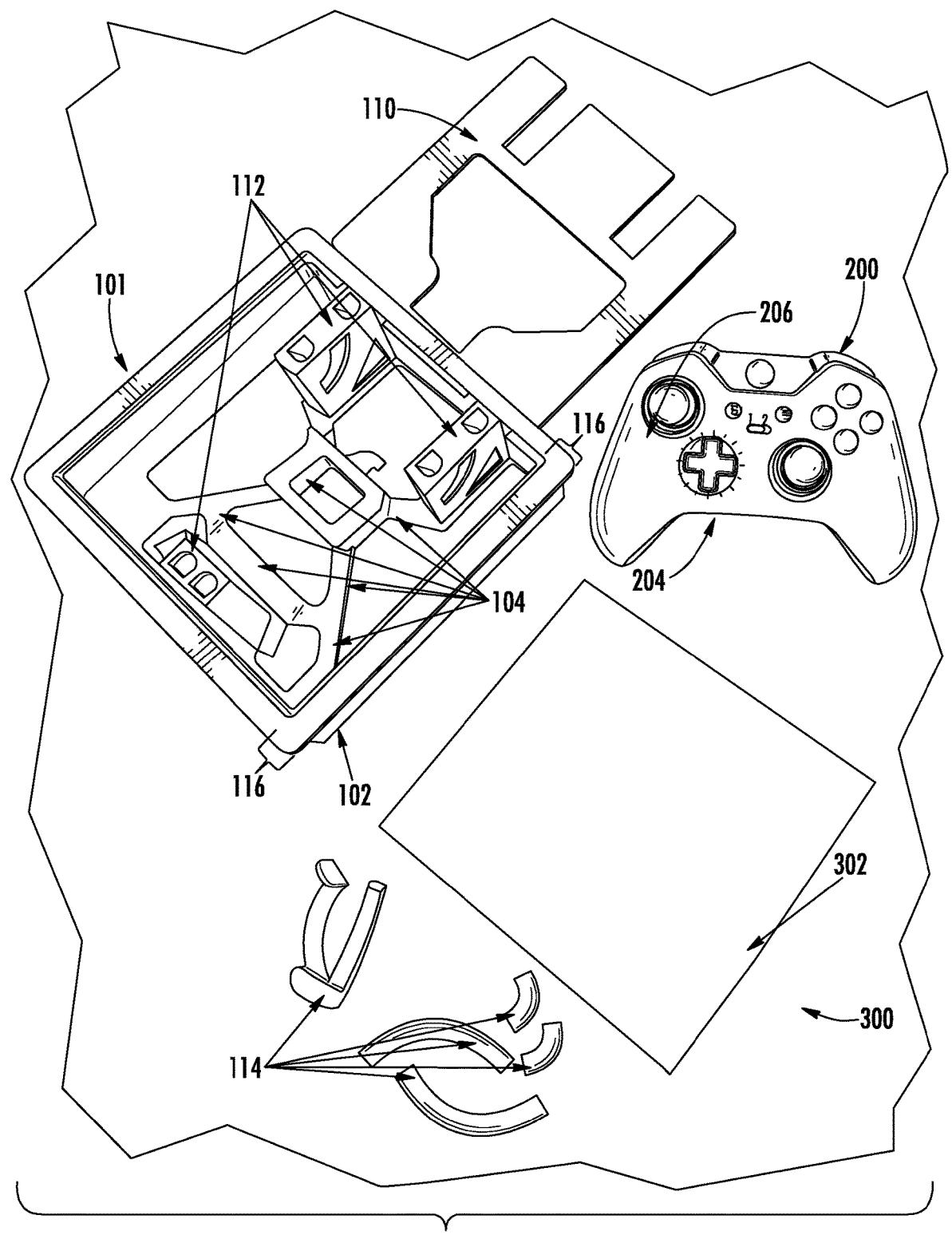

FIG. 3B illustrates a top down view of the exploded view of FIG. 3A removed from the planar surface, in accordance with an example embodiment.

Figure 4:
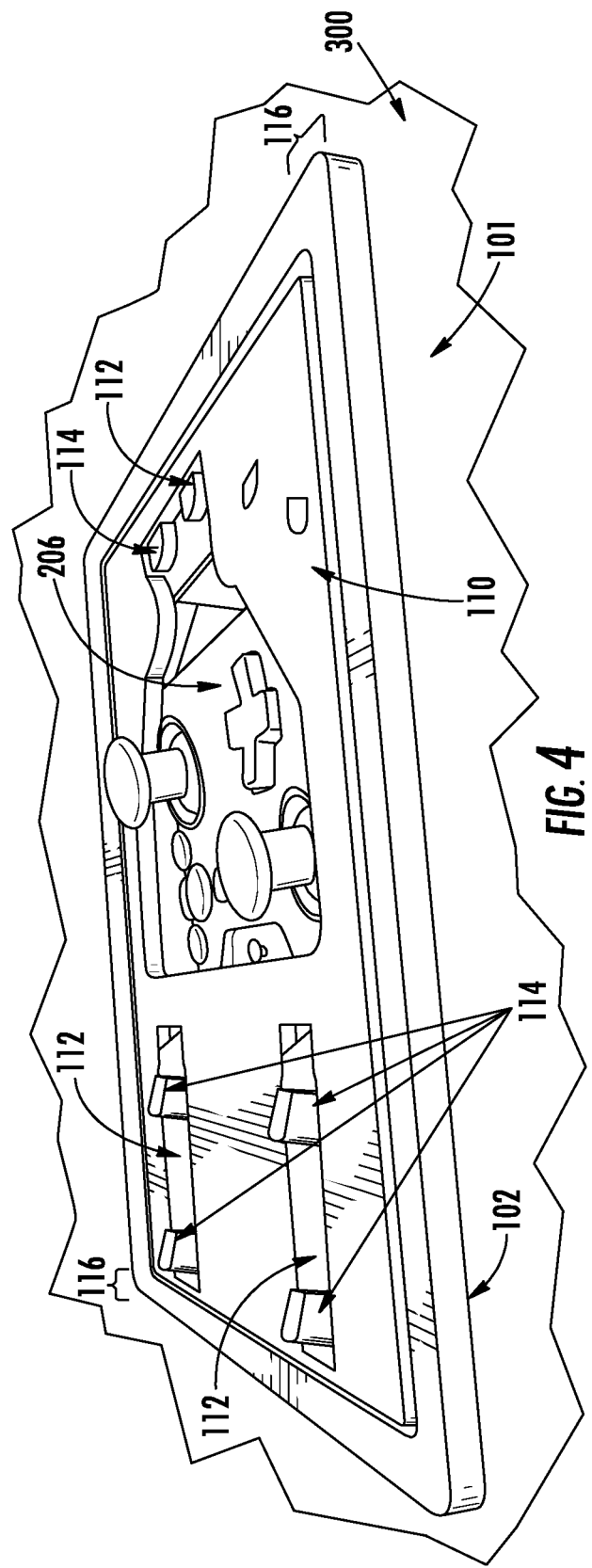

FIG. 4 illustrates a perspective view of an assembled gaming support apparatus and associated gaming controller installed in a planar surface, in accordance with an example embodiment.

Figure 5:
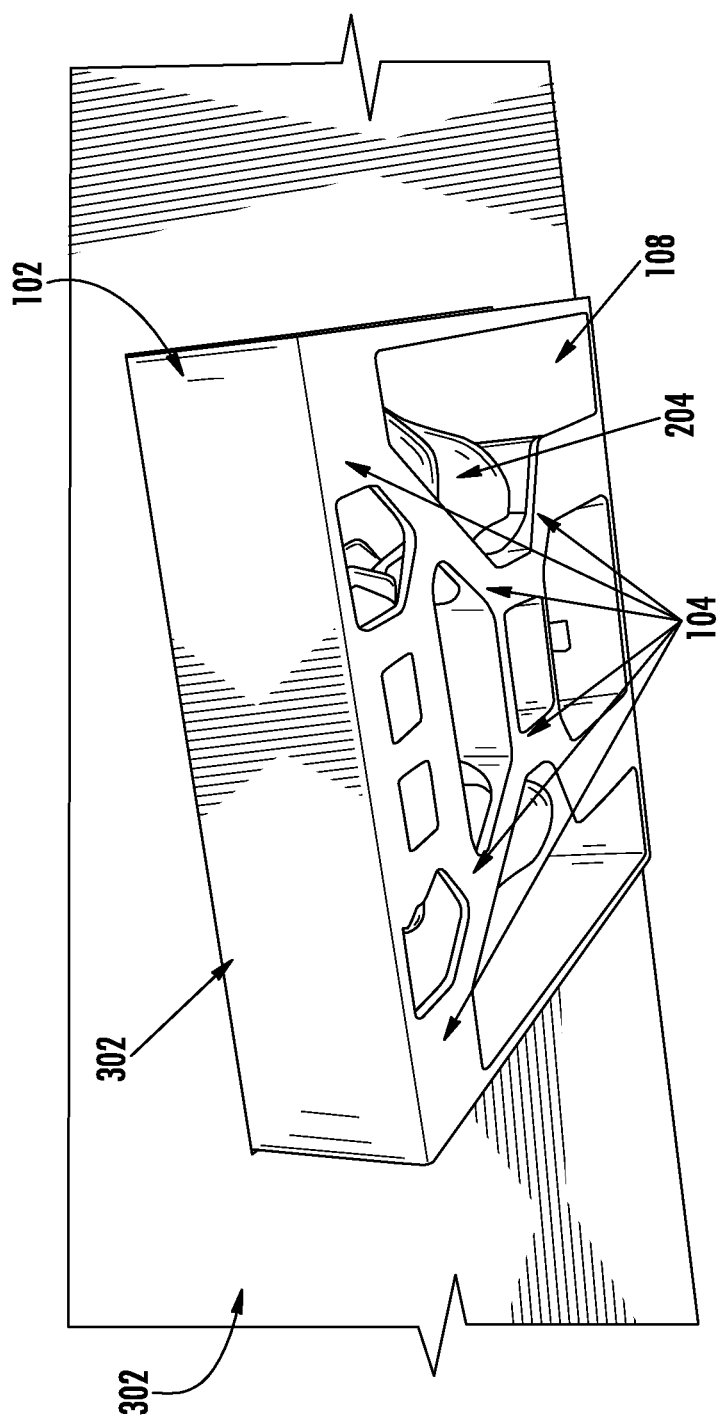

FIG. 5 illustrates a bottom perspective view of the embodiment of FIG. 4, in accordance with an example embodiment.

Figure 6:
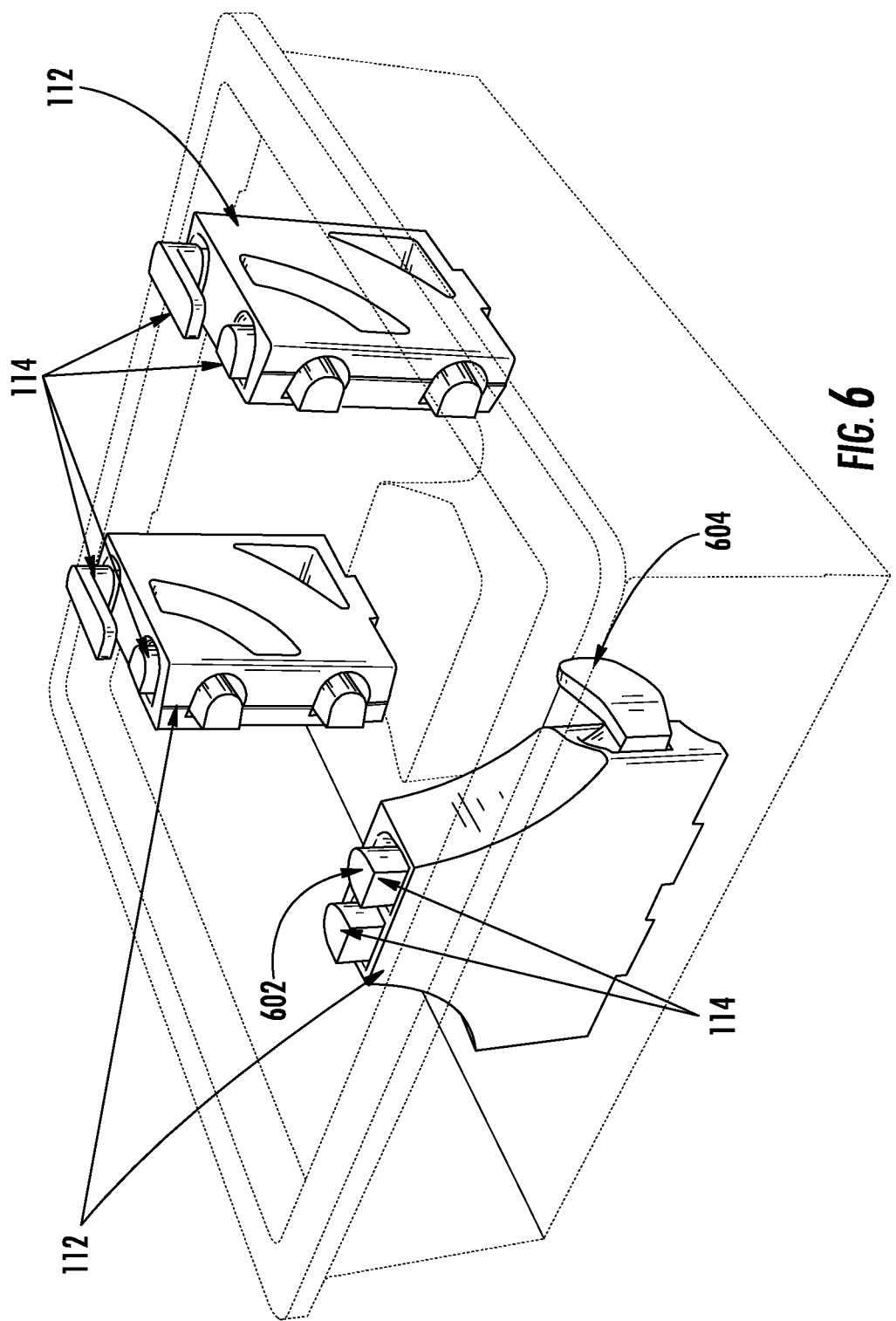

FIG. 6 illustrates a perspective view of example button assemblies installed in a holster body, in accordance with an example embodiment.

FIG. 7 illustrates an exploded perspective view of the gaming support apparatus, in accordance with an example embodiment.

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. As would be evident to one of ordinary skill in the art in light of the present disclosure, the term "substantially" indicates that the referenced element or associated description is accurate to within applicable engineering tolerances. Additionally, the example embodiments of the present invention may be described and illustrated in conjunction with reference to a wireless Xbox Elite controller of Microsoft® Corporation as the gaming controller; however, the embodiments of the present invention may be equally applicable for use with any gaming controller (e.g., PlayStation® controllers of Sony® Corporation, Wii® controllers of Nintendo®, Nintendo Switch of Nintendo®, or the like) of any manufacturer without limitation.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements.

With reference to FIG. 1, a holster body 101 of a gaming support apparatus 100 is illustrated installed in a planar surface 300 (e.g., a table, desk, etc.). As shown in FIG. 1, the holster body 101 may be configured to receive a gaming controller 200 within the holster body 101 so as to support the weight of the gaming controller 200. The holster body 101 may define a peripheral wall 102 that, in an instance in which the holster body 101 receive a gaming controller 200 (e.g., an operational configuration), the peripheral wall 102 at least partially encloses the gaming controller 200. As shown in the embodiment of FIG. 1, the peripheral wall 102 may be dimensioned (e.g., sized and shaped) in a rectangular configuration such that at least two sides of the gaming controller 200 contact or are otherwise disposed proximate the peripheral wall 102. While described and illustrated herein with reference to a rectangular peripheral wall 102 (e.g., and associated shape for the holster body 101), the present disclosure contemplates that the peripheral wall 102 may be formed in any shape so as to accommodate gaming controllers 200 of any size and shape received therein.

With continued reference to FIG. 1, and as described further with reference to FIGS. 3A-3B below, the holster body 101 may define a support web 104 configured to, in the operational configuration, support the gaming controller 200. As would be evident to one of ordinary skill in the art in light of the present disclosure, the support web 104 may be configured to support the gaming controller 200 via contacting one or more surfaces of the gaming controller 200 (e.g., a second surface 204 in FIGS. 3A-3B). The support web 104 may, in some embodiments, be configured based upon the gaming controller 200 received therein. By way of example, as shown in FIG. 1, the example gaming controller 200 includes two rounded points located in adjacent corners of the peripheral wall 102. As such, the support web 104 may include support elements disposed at these locations in order to support the rounded points of the gaming controller 200 in the operational configuration.

The holster body 101 may further define at least one opening (e.g., a first opening 106) configured to, in the operational configuration, allow access to one or more input elements (e.g., controller buttons 202 and/or joysticks 204) of the gaming controller 200 received by the holster body 101. As shown, the first opening 106 may be defined by the internal area enclosed by the peripheral wall 102 such that the entire interior of the holster body 101 may be accessed via the first opening 106. In other embodiments, the first opening 106 may be defined so as to only allow access to a portion of the holster body 101 and associated gaming controller 200 housed therein. As shown in FIG. 1, the first opening 106 may allow a user to articulate (e.g., move, input commands, etc.) one or more of the controller buttons 202 and/or joysticks 204 of the gaming controller 200. As would be evident to one of ordinary skill in the art in light of the present disclosure, the first opening 106 may be dimensioned (e.g., sized and shaped) so as to accommodate (e.g., allow access to) a gaming controller 200 of any size or type.

With reference to FIG. 2, the gaming support apparatus 100 may further include a cover plate 110 configured to at least partially enclose the holster body 101. The cover plate 110 may be dimensioned (e.g., sized and shaped) so as to mesh with the holster body 101 (e.g., be received by) and contact the peripheral wall 102. By way of example, in an embodiment in which the peripheral wall 102 is defined as a rectangular configuration, the cover plate 110 may similarly define a rectangular shape so as to create an enclosure when received by the peripheral wall 102 of the holster body 101. In the operational configuration, the cover plate 110 may further be disposed proximate the first surface 206 of the gaming controller 200. In some embodiments, the cover plate 110 may further prevent removal of the gaming controller 200 from the holster body 101 (e.g., serve a locking or securing function). As shown in FIG. 2, the cover plate 100 may further define various cutouts (e.g., or otherwise open sections) so as to allow a user to access the input elements (e.g., controller buttons 202 and/or joysticks 204) of the first surface 206 of the gaming controller 200. Furthermore, as illustrated and described hereafter with reference to FIGS. 3A-3B, the cover plate 110 may further define various cutouts configured to accommodate one or more button assemblies (e.g., button assemblies 112) of the gaming support apparatus 100.

With reference to FIGS. 3A-3B, exploded views of the gaming support apparatus 100 are illustrated with the holster body 101 installed and removed, respectively, from a planar surface 300. As described above, the holster body 101 defines a support web 104 configured to support the weight of the gaming controller 200 by the holster body. In particular, the support web 104 may be configured, in the operational configuration, to contact a second surface 204 of the gaming controller 200 so as to support the weight of the gaming controller 200. As shown in FIGS. 3A-3B, the support web 104 may define any number of elements, beams, rails, or the like that span some or all of the enclosure created by the peripheral wall 102. Some or all of these elements (e.g., depending upon the size or type of the gaming controller 200 received therein) may contact the second surface of the gaming controller 200. In some embodiments as shown, the support web 104 may, to reduce manufacturing costs, via less required material, include various open spaces that do not contact the gaming controller 200. In other embodiments, the support web 104 may define a back wall (not shown) that extends between each of the peripheral wall sections 102 so as to enclose the holster body 101 on one end.

With continued reference to FIGS. 3A-3B, in some embodiments, the gaming support apparatus 100 may also include one or more button assemblies 112 supported by the holster body 101. As shown, each button assembly 112 may be configured to receive a user input proximate the first surface 206 of the gaming controller 200 so as to actuate one or more input elements defined by the second surface 204 of the gaming controller 200. As would be evident to one of ordinary skill in the art in light of the present disclosure, various types, models, etc. of gaming controllers 200 may include input elements (e.g., knobs, triggers, bumpers, buttons, or the like) that are located opposite the primary (e.g., upward facing first surface 206) of the gaming controller 200. In order to actuate these input elements when the gaming controller 200 is received by the holster body 101 (e.g., in the operational configuration) the gaming support apparatus 100 utilizes one or more button assemblies 112 that may transmit the force input by the user proximate the first surface 206 of the gaming controller 200 to the input elements defined by the second surface 204 of the gaming controller 200.

In some embodiments, the one or more button assemblies 112 each define a leaf spring 114 configured to, at a first end (e.g., first end 604 in FIG. 6), contact an input element defined by the second surface 204 of the gaming controller 200, and, at a second end (e.g., second end 602 in FIG. 6), receive a user input. As would be evident to one of ordinary skill in the art in light of the present disclosure, each leaf spring 114 may, upon input of force by a user, deform and cause an opposing end of the spring to actuate a button, trigger, bumper, or the like on the second surface 204 of the controller. Upon removal of the inputted user force, the spring force stored in the leaf spring 114 may cause the leaf spring to return to its resting position and remove contact with the associated button, trigger, bumper, or the like on the second surface 204 of the gaming controller 200.

In some embodiments, the one or more button assemblies 112 may be displaceable within the holster body 101 and/or removable from the holster body 101 so as to accommodate a gaming controller 200 of any dimension (e.g., size and shape). As described above, the gaming support apparatuses 100 of the present disclosure may be configured to receive a gaming controller 200 of any type. As such, the one or more button assemblies 112 may be movable within the enclosure created by the peripheral wall 112 so as to accommodate gaming controllers 200 of different sizes. Furthermore, as described above, the cover plate 110 may similarly define cutout areas configured to accommodate various locations of the button assemblies 112.

As shown in FIG. 3B, the holster body 101 of the gaming support apparatus 100 may be configured to be received by a corresponding cavity 302 defined in a planar surface 300 such that, in the operational configuration, the planar surface 300 supports the weight of the holster body 100 and gaming controller 200 disposed therein. As described above, the embodiments of the present disclosure are configured to support the gaming controller 200 such that a user may actuate the one or more input elements of the gaming controller 200 without supporting the weight of the gaming controller 200. As such, in some embodiments, the holster body 101 may be installed in a cavity 302 defined by a planar surface 300 (e.g., table, desk, or the like). In this way, the weight of the gaming controller 200 is supported by the gaming support apparatus 100 and the planar surface 300 instead of by the user.

In order to facilitate this support, in some embodiments, the peripheral wall 102 further comprises a lip member 116 configured to engage the planar surface 301 so as to limit movement of the holster body 101 to a single direction. Said differently, and as illustrated further in FIGS. 4-5 described hereafter, the lip member 116 may be configured to contact the planar surface 300 in an instance in which the holster body 101 is received by the corresponding cavity 302. Furthermore, the present disclosure contemplates that the corresponding cavity 302 may be dimensioned (e.g., size and shaped) so as to accommodate a holster body 101 of any shape or size. In other embodiments, the gaming support apparatus 100 may further define the planar surface 300. By way of example, the holster body 100 may be installed in a planar surface 300 such that the planar surface 300 is formed integral to the holster body 101. Said differently, the gaming support apparatus 100 of the present disclosure may include a planar surface (not shown) that is permanently attached to the holster body 101 (e.g., a lap desk or the like). In such an embodiment, no modification to a planar surface 300 to include a corresponding cavity 302 is necessary.

With reference to FIGS. 4-5 a top and bottom view, respectively, of the gaming support apparatus 101 installed in a planar surface 301 is illustrated. Once installed as shown, a user is not required to support the weight of the gaming controller 200 and may instead rest his or her arms upon the planar surface 300. In this way, users with difficulty supporting a gaming controller with their hands alone may actuate the buttons, knobs, bumpers, joysticks, etc. of the gaming controller 200 without the additional stress required to support the weight of said controller. Furthermore, as shown in FIG. 4, the location of the input elements of the gaming controller 200 when installed in the planar surface 300 may be such that these elements are substantially flush with the surface of the planar surface 300. In this way, user access to the input elements is improved.

With reference to FIG. 5, a bottom view of the holster body 101 of the gaming support apparatus 100 installed in a planar surface 300 is illustrated. As shown, in some embodiments, the holster body 101 may define a second opening 108 opposite the first opening 106 configured to allow access to the second surface 204 of the gaming controller 200. As would be evident to one of ordinary skill in the art in light of the present disclosure, access to the second surface 204 of the gaming controller 200 may be necessary in order to properly secure the gaming controller 200 within the holster body 101. In other instances, the second opening 108 may allow a user to modify the gaming support assembly 100 so as to accommodate gaming controllers 200 of different sizes and shapes. Furthermore, as would be evident to one of ordinary skill in the art, some gaming controllers 200 require a wired connection between the gaming controller 200 and a gaming console (not shown). In such an embodiment, the second opening 204 may be configured to accommodate such a wired connection between the gaming controller 200 and the gaming console (not shown). Still further, the second opening 204 may also be configured to allow access to the interior of the holster body 101 while installed with the cover plate 110 to allow for repair, cleaning, or the like of the claimed assembly.

With reference to FIGS. 6 and 7, a perspective view of example button assemblies 112 of the present disclosure and an exploded view of the gaming support apparatus 100, respectively, are illustrated. With regard to manufacturing the elements illustrated in these figures, the present disclosure contemplates that the present invention may be created from any suitable material know in the art (e.g., polymers, ceramics, plastic, and/or the like). As shown in FIGS. 6-7, in some embodiments, the holster body 101, cover plate 110, and/or button assemblies 112 may be created by a 3D printing process. In other embodiments, these elements and other may be produced by an extrusion process or an injection molding process. Furthermore, these elements may, in some embodiments, be formed as a single integral member so as to improve the support and rigidity of the assembly. In other embodiments, such as shown in FIGS. 6-7, these elements may be produced as separate, distinct elements so as to form a modular assembly with improved adjustment based upon the dimensions of the gaming controller 200 received therein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the gaming support apparatus. Therefore, it is to be understood that the inventions are not to be limited to the specific embodiments disclosed and that modifications and other embodiments are intended to be included within the scope of the appended claims.

What is claimed is:

1. A gaming support apparatus comprising:
    a holster body for receiving a gaming controller disposed therein, the holster body defining:
        a peripheral wall, wherein the peripheral wall is configured to bound an interior of the holster body;
        a support web connected to the peripheral wall and disposed proximate a second side of the holster body; and
        at least one opening in the holster body configured to allow access to the interior of the holster body; and
    one or more button assemblies attached to the support web, wherein each button assembly is configured to receive a user input proximate a first side of the holster body and convey the user input to a location proximate the second side of the holster body.

2. The gaming support apparatus according to claim 1, wherein the at least one opening of the holster body is disposed proximate the first side of the holster body.

3. The gaming support apparatus according to claim 2, further comprising a cover plate configured to at least partially block the at least one opening in the holster body.

4. The gaming support apparatus according to claim 2, wherein the support web further defines one or more a second openings to allow access to the interior of the holster body via the second side of the holster body.

5. The gaming support apparatus according to claim 1, wherein the holster body is configured to be received by a corresponding cavity defined in a planar surface such that, in the operational configuration, the planar surface supports the weight of the holster body and gaming controller disposed therein.

6. The gaming support apparatus according to claim 1, wherein the peripheral wall further comprises a lip member that extends outward from the peripheral wall.

7. The gaming support apparatus according to claim 1, wherein the one or more button assemblies each define a leaf spring configured to, at a second end, receive the user input.

8. The gaming support apparatus according to claim 1, wherein the one or more button assemblies are displaceable within the holster body and removable from the holster body.

9. The gaming support apparatus according to claim 6, wherein the lip member is substantially perpendicular with respect to the peripheral wall.

10. The gaming support apparatus according to claim 7, wherein each leaf spring is formed of an arcuate shape.

11. The gaming support apparatus according to claim 1, wherein the user input received by the one or more button assemblies proximate the first side of the holster body is substantially perpendicular with respect to a direction of the conveyance of the user input to the location proximate the second side of the holster body.

12. The gaming support apparatus according to claim 7, wherein each leaf spring further defines a first end opposite the second end, wherein the first end is displaced via the user input received at the second end of the leaf spring.

13. The gaming support apparatus according to claim 3, wherein the support web is further configured to enclose the second side of the holster body.

14. The gaming support apparatus according to claim 6, wherein, in an instance in which the holster body is received by a corresponding cavity defined in a planar surface, the lip is configured to limit movement of the holster body to a single direction.

15. The gaming support apparatus according to claim 14, wherein the user input received at the second end of the leaf spring is substantially perpendicular with respect to the displacement of the first end of the leaf spring.

* * * * *